United States Patent
Brown, Jr. et al.

[11] 3,815,410
[45] June 11, 1974

[54] ENGINE THERMODYNAMIC CYCLE ANALYSER

[75] Inventors: William L. Brown, Jr., Peoria; John L. Hoffman, East Peoria; Maurice E. Schaefer, Morton, all of Ill.

[73] Assignee: Caterpillar Tractor Co., Peoria, Ill.

[22] Filed: Dec. 7, 1972

[21] Appl. No.: 313,115

[52] U.S. Cl................................. 73/115, 73/117.3
[51] Int. Cl. ........................................... G01m 15/00
[58] Field of Search ........ 73/117.2, 116, 115, 117.3

[56] References Cited
UNITED STATES PATENTS
2,800,014  7/1957  Welch et al........................... 73/116
3,495,451  2/1970  Verhoef............................. 73/117.3

Primary Examiner—Jerry W. Myracle
Attorney, Agent, or Firm—Phillips, Moore, Weissenberger, Lempio & Strabala

[57] ABSTRACT

Instumentation attachable to an engine provides for a rapid and highly accurate measurement of power produced at the face of a piston in terms of Indicated Mean Effective Pressure or other indicated power units and may also provide a thermodynamic cycle diagram display and other data of interest in analyzing engine performance. A pressure transducer at the combustion chamber provides an electrical signal indicative of instantaneous pressure while a volume signal generator coupled to the engine crank shaft provides a voltage proportional to instantaneous combustion chamber volume. A circuit differentiates the volume signal to obtain a piston velocity signal which is multiplied by the instantaneous pressure signal and averaged for readout at a digital volt meter in terms of Indicated Mean Effective Pressure or the like. The volume signal generator also produces accurate top dead center and bottom dead center pulses to control gating means for obtaining information applicable to selected portions of the total engine cycle and for facilitating calibration.

10 Claims, 4 Drawing Figures

PATENTED JUN 11 1974 3,815,410
SHEET 1 OF 2
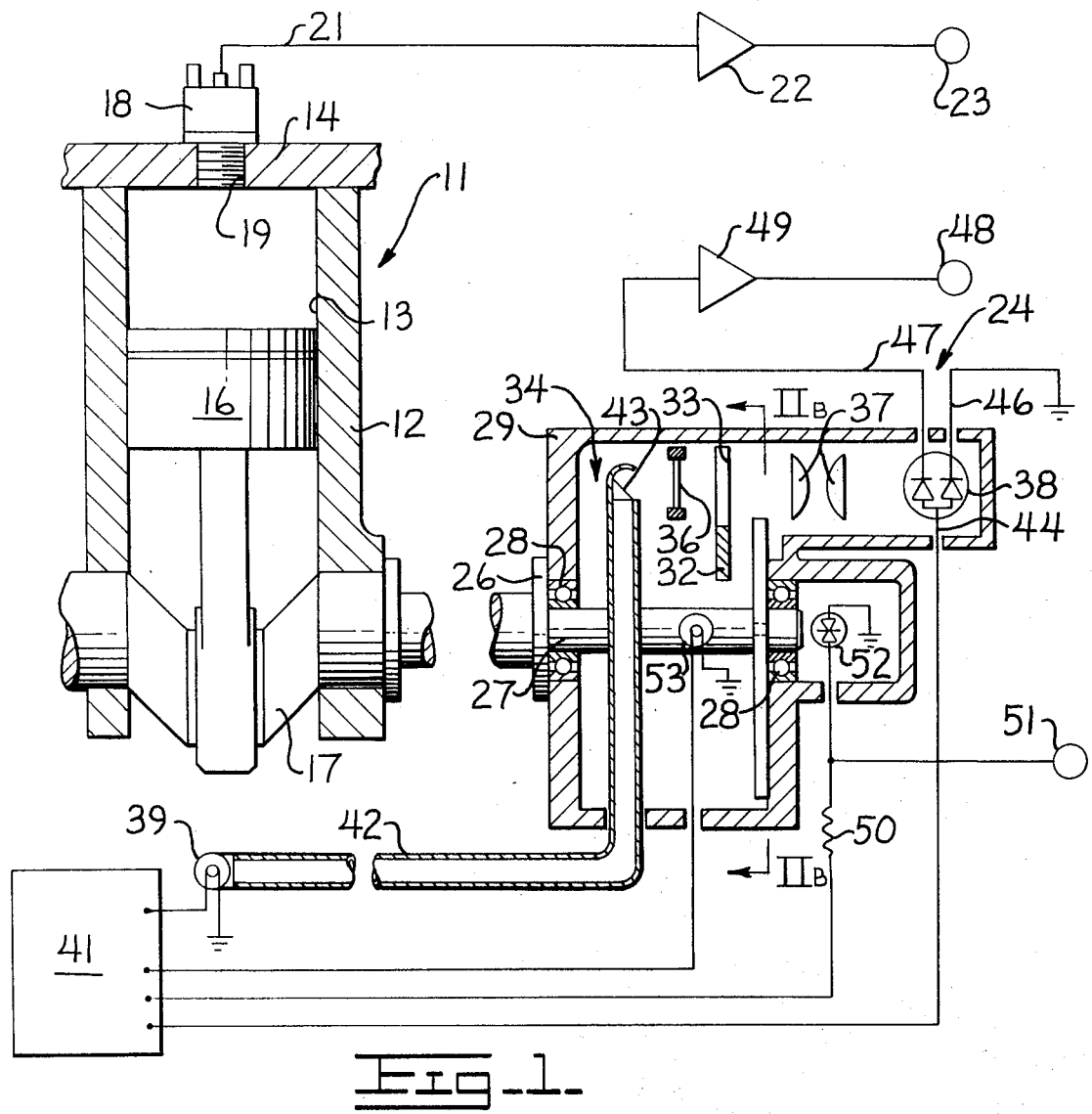
Fig_1_
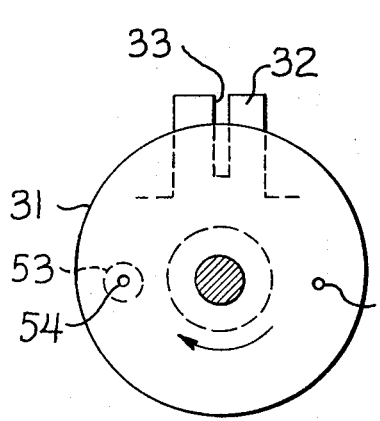
Fig_2A_
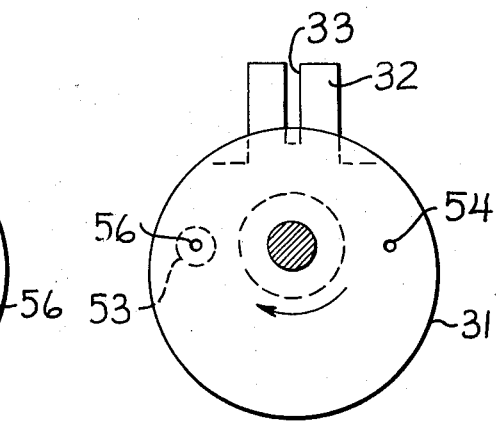
Fig_2B_

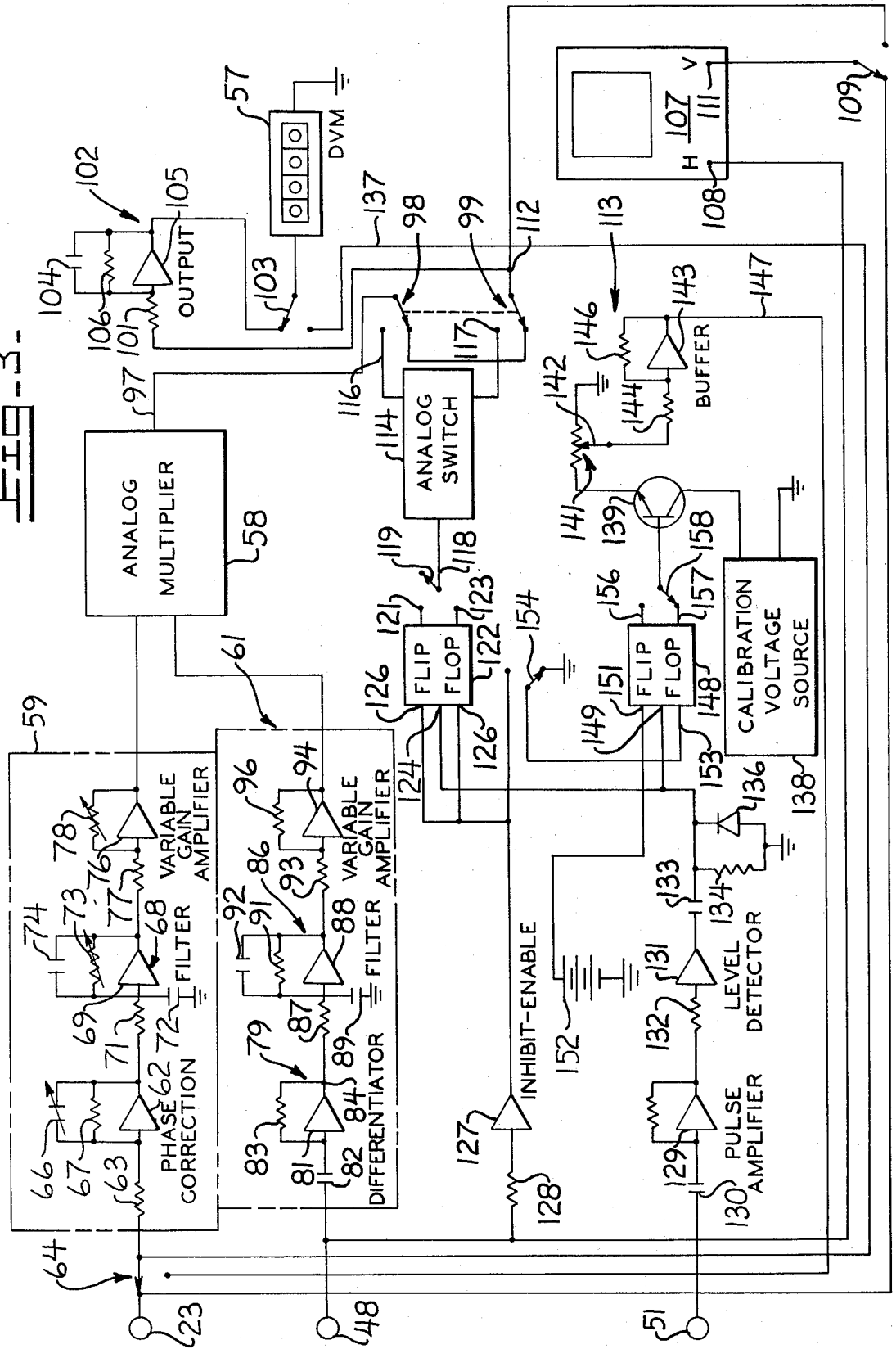

ENGINE THERMODYNAMIC CYCLE ANALYSER

BACKGROUND OF THE INVENTION

Power output is a parameter of primary importance in connection with the design and evaluation of engines. Devices for accurately measuring brake power, popularly known as "horsepower" were developed at a very early stage in the evolution of internal combustion engines. However, brake power is measured at the flywheel or other output element of the engine and does not necessarily provide a complete understanding of engine efficiency with respect to converting the energy content of fuel into kinetic energy. In order to fully evaluate and to improve engine design, it has been recognized that it is also desirable to measure power as produced directly at the face of the pistons so that the losses of the thermodynamic cycle can be distinguished from friction losses within the engine mechanism. Power produced at the piston face is known as Indicated Power, as distinguished from Brake Power, and instruments for determining Indicated Power are called indicators.

The first indicators were mechanical devices that traced a closed pressure-volume cycle diagram on a card. Mechanical planimeters were then used to measure the area of the diagram. This area was then divided by the length along the volume axis and the resulting mean height was multiplied by the pressure scale factor to obtain a parameter which has come to be known as "Indicated Mean Effective Pressure" hereinafter abbreviated as "IMEP." IMEP is a convenient measure of the indicated power output of the thermodynamic cycle as such and has continued to be used for this purpose although the original mechanical indicator instruments are now generally considered to be obsolete.

The original indicators provided reasonable accuracy only for very slow engines and have been largely abandoned in favor of more recently developed electronic instruments which produce a pressure volume cycle diagram from instantaneous pressure and volume signal generating means attached to the engine or, in some cases, a direct readout of indicated power. Accuracy has continued to be a very serious problem with presently known electronic indicators. The most accurate electronic indicator instruments presently in general use are known as balanced pressure indicators and function essentially by producing a time signal when instantaneous combustion chamber pressure matches a known reference pressure. By changing the reference pressure through many steps and repeating the measurement a large number of times, a graph of pressure variation throughout a complete engine cycle is produced and indicated power and related parameters may be determined by measurement and calculations as discussed above for the earlier mechanical devices. This is time consuming and still does not provide the degree of accuracy which is desirable.

Aside from problems of accuracy, prior electronic indicator instruments lack the ability to quickly and conveninetly readout IMEP for a component portion of the total engine cycle, such as the working cycle (compression and power strokes) or the pumping cycle (exhaust and intake strokes) or other related data which can be derived from a knowledge of pressure and volume changes within an engine cylinder.

SUMMARY OF THE INVENTION

This invention provides for a highly accurate and rapid readout of data such as indicated power, derivable from a knowledge of pressure and volume variations within the combustion chamber of an engine. A transducer disposed at the combustion chamber produces a voltage proportional to instantaneous pressure while a volume signal generator preferably linked to the crankshaft of the engine delivers a voltage proportional to instantaneous combustion chamber volume and also timing pulses accurately indicative of the top dead center and bottom dead center positions of the piston. Circuit means differentiates the volume signal to obtain a piston velocity signal which is multiplied by the pressure signal and averaged over a plurality of cycles for readout at a volt meter or the like which may be calibrated in terms of IMEP or other indicated power units. The signals may also be applied to an oscilloscope to generate a thermodynamic cycle diagram. Gating means, responsive to the timing pulses, are provided to obtain data from selected portions of the total working cycle such as the pumping cycle portion and the working cycle portion. The system includes several means for maintaining extreme precision including calibration means and means for assuring phase coordination between the pressure signal and volume signal. Accuracy of the volume signal is enhanced by utilizing a volume signal generator having an eccentric cam, linked to the engine crankshaft, which is situated between a photo-electric element and a light source. In a preferred form of the invention, the light source is remote from the engine to avoid inaccuracies from vibration induced fluctuations of the source. Other novel features of the invention will be hereinafter pointed out in connection with the detailed description thereof.

Accordingly, it is an object of this invention to provide for a more accurate and convenient determination of indicated power in an engine.

It is another object of the invention to provide accurate and rapid means for determining such engine parameters as IMEP, combustion chamber pressure and volume variations and thermodynamic cycle diagrams for a complete working cycle of an engine or for selected portions of a working cycle.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 illustrates instrumentation which is coupled directly to an engine to obtain input information therefrom, portions of the structure being shown in diagramatic form, FIGS. 2A and 2B illustrate successive positions of certain elements of the instrumentation of FIG. 1 during two successive stages of the engine cycle, and FIG. 3 is a schematic diagram of the electronic circuit of the invention which receives and processes signals from the instrumentation depicted in FIG. 1.

DESCRIPTION OF A PREFERRED EMBODIMENT

Referring intially to FIG. 1 of the drawing, an internal combustion engine 11 typically has an engine block 12 with one or more cylindrical combustion chambers 13 formed therein with the upper end of the chamber being closed by a head member 14. A piston 16 is disposed for reciprocal motion in chamber 13 and is coupled to a crankshaft 17 for converting the piston motion to rotary motion. The engine 11 may be of any of many known forms of internal combustion engine and accordingly will not be described in greater detail except for modifications necessary to connect the present invention therewith.

Such modifications include the mounting of a pressure transducer 18 in a suitable position wherein the transducer is exposed to the pressure within chamber 13. If the engine is not already equipped with suitable means for mounting such a transducer, a special head member 14 having a threaded bore 19 for receiving the transducer may be temporarily substituted for the original head. Suitable transducers 18 of this form which produce an electrical voltage that is accurately proportional to the instantaneous ambient pressure in the monitored region are known to the art and accordingly will not be herein described in detail. The output 21 of transducer 18 is connected to a preamplifier 22 having an output terminal 23 to which the amplified combustion chamber pressure signal is continuously applied for purposes to be herinafter described.

In order to determine indicated power and other data related to the thermodynamic cycle of the engine 11, it is necessary to have a second signal indicative of the instantaneous position of piston 16 within chamber 13. For this purpose, a volume signal generating means 24 is situated at the engine and is coupled to an element thereof, such as crank shaft 17, which rotates synchronously with piston movement. The crank shafts of most engines include some element, such as a terminal flange 26, to which a rotary input shaft 27 of volume signal generating means 24 can readily be coupled. Input shaft 27 is journalled, such as by bearings 28, in a housing 29 which is fixed relative to engine block 12.

Referring now to FIGS. 2A and 2B in conjunction with FIG. 1, a circular disk 31 is disposed on shaft 27 within housing 29 in eccentric relation to the shaft. Housing 29 includes an opaque member 32 disposed adjacent disk 31 and having a slot 33 aligned radially with respect to the axis of rotation of disk 31. Member 32 is positioned so that the disk 31 covers a major portion of the length of the slot 33 as illustrated in FIG. 2A, when the piston 16 is at top dead center position within cylinder 13, and uncovers a major portion of the length of the slot as illustrated in FIG. 2B when the piston is at bottom dead center position. Accordingly, the proportion of slot 33 which is uncovered by disk 31 varies cyclically from a minimum to a maximum and back to the minimum with each 360° of rotation of the engine crank shaft and the effective length of the slot continuously changes in exact correspondence with changes in the effective volume of combustion chamber 13.

Referring again to FIG. 1 in particular, the above described variation in the portion of slot 33 which is covered by disk 31 is utilized to generate a volume signal in the form of a DC voltage which varies in correspondence with the variation of the volume of combustion chamber 13 of the engine. For this purpose, a light source 34 is situated within housing 29 at one side of member 32 and disk 31 to illuminate a diffuser 36 formed of translucent material such as opal glass which is situated between the light source and member 32. Lenses 37 situated on the opposite side of member 32 and disk 31 focus an image of the illuminated diffuser 36 on a first photodiode 38. Owing to the presence of member 32 and disk 31 between the diffuser 36 and photodiode 38, the amount of light reaching the photodiode varies cyclically as the engine crankshaft 17 revolves and increases and decreases in accordance with changes of the effective volume of combustion chamber 13.

While the light source 34 might consist of an electric lamp situated within housing 29, we have found that such an arrangement tends to reduce accuracy of the volume signal apparently because of the vibration which is generally present where a structure is attached to an operating engine. It appears that vibration induced strains in the filament of a light bulb cause a variation of resistance in the manner of a strain gauge which in turn creates flucuations in light output. Where extreme accuracy is desired as in this example, it is preferable that the light source 34 consist of an electric lamp 39 energized from a DC power supply 41 wherein the lamp is situated apart from the engine 11 and housing 29. A fiber optic light pipe 42 then extends from lamp 39 into housing 29 and is provided with a termination 43 which emits light onto the diffuser 36.

DC power supply 41 supplies the several different voltages necessary to operate electrical components of the system to be hereinafter described, included in the photodiode 38. The photodiode 38 may be of the known form having an input terminal 44 to which a constant DC voltage is supplied, a ground terminal 46 and an output terminal 47 at which a DC voltage is produced that is proportional to the intensity of ambient light impinging on the photodiode surface. The voltage at output terminal 47 varies cyclically, in accordance with the amount of light transmitted through slot 33, as crankshaft 17 turns and is always proportional to the instantaneous position of piston 16 in combustion chamber 13. To optimize the response time of photodiode 38, output terminal 47 is connected directly to the inverting input of an operational amplifier 49, having an output connected to a volume signal terminal 48.

Accordingly, the instrumentation depicted in FIG. 1 produces a pressure signal at terminal 23 in the form of a DC voltage which is a function of instantaneous pressure within combustion chamber 13 and also produces a volume signal at terminal 48 in the form of a DC voltage which is proportional to instantaneous volume of the combustion chamber. For purposes to be herinafter described, an additional output terminal 51 is provided at which timing pulse signals are generated each time the piston 16 reaches the top dead center (uppermost) and bottom dead center (lowermost) positions in the reciprocal movement thereof. For this purpose, a second photodiode 52 within housing 29 is connected between ground and power supply 41 through a resistor 50 with the junction between the photodiode and resistor being connected to terminal 51. A lamp 53, energized by connection between power source 41 and ground, is disposed within housing 29 at the opposite side of disk 31 from photodiode 52 and in a similar radially spaced position from the rotary axis of the disk. As best seen in FIGS. 2A and 2B, small apertures 54 and 56 are provided in disk 31, the apertures being angularly spaced 180° apart relative to the rotary axis of the disk and being spaced radially therefrom a distance equal to the spacing of the lamp 53 and photodiode 52 therefrom. This radial spacing of apertures 54 and 56, from the rotary axis of disk 31, is made sufficiently small to prevent the apertures from passing across slot 33 of member 32 and thereby distorting the volume signal. Aperture 54 is located angularly on disk 31 to pass between the lamp 53 and photodiode 52 when the piston 16 is at top dead center position and aperture 56 passes between the lamp and photodiode at the bottom dead center position of the piston. Thus, photodiode 52 is momentarily illuminated and generates a brief pulse at terminal 51 each time that the piston 16 reaches the top dead center and bottom dead center positions.

Considering now the circuit by which the volume signal, pressure signal and timing signals are processed and analyzed to produce the desired information, reference should be made to FIG. 3 wherein the three signal terminals 23, 48 and 51 are again depicted. The structure and operation of the circuit of FIG. 3 is more readily understood by first considering the mathematical processes through which the circuit provides for a direct readout of IMEP at a digital voltmeter 57.

From thermodynamics, the definition of work for a reciprocating engine is:

$$\text{WORK} = \int P dV$$

WHERE: $P$=Pressure $V$=Volume where the integral is evaluated completely around the cycle. This is the integral that was, in effect, evaluated from the P-V diagram by the mechanical techniques hereinbefore discussed. Strictly speaking, this integral is only true for a thermodynamic system that is in equilibrium, and many engines are not at equilibrium throughout the cycle. A more fundamental definition of work that is valid for an engine that is not in equilibrium is:

$$\text{WORK} = \int F dx$$

where F is the force vector on the piston due to gas pressure parallel to the direction of piston motion, $x$.

Our tests have shown that the two integrals set forth above have the same value, even though the measured pressure may be a very poor indication of the force on the piston at a given instant of time (such as during detonation). The easiest way to understand the primary function of the circuit is in terms of indicated power. The product of piston velocity, $dx/dt$, times the vector component of force parallel to the motion, F, is equal to the instantaneous indicated power.

Indicated Power $= F \cdot dx/dt$

The average power of the cycle is simply the average value of the force - velocity product, and this is what is evaluated by the circuit of FIG. 3. Specifically:

$$\text{Average indicated power} = \frac{\int_{t_1}^{t_2} F \cdot \frac{dx}{dt} \cdot dt}{t_2 - t_1} = \frac{PLAN}{n}$$

WHERE: $P$ = IMEP
$L$ = Stroke
$A$ = Area of Combustion chamber bore
$N$ = rpm
$t$ = Time
$n$ = revolutions per cycle The $(t_2 - t_1)$ term is made large enough to include many cycles. Rearranging the terms gives $$P = (IMEP) = \frac{n \int_{t_1}^{t_2} F \cdot \frac{dx}{dt} \cdot dt}{L A N (t_2 - t_1)}$$

since $F = p \cdot A$ where $p$ = cylinder pressure then $$IMEP = \frac{n}{LN} \frac{\int_{t_1}^{t_2} p \cdot \frac{dx}{dt} \cdot dt}{(t_2 - t_1)}$$

The IMEP, then, can be determined from an analog system consisting of an accurate analog signal for pressure, an accurate analog signal for piston velocity, and an accurate analog multiplier. The average power is proportional to the average $p \cdot dx/dt$ signal from the multiplier, and the system can be calibrated in units of mean effective pressure.

Thus, in FIG. 3, an analog multiplier 58 is provided to multiply the pressure signal by the differentiated volume signal with the product signal from the multiplier being averaged and applied to the input of the voltmeter 57. Accordingly, a pressure signal channel, designated generally by numeral 59, connects terminal 23 and one input of multiplier 58 and a volume signal channel 61 connects terminal 48 and the other input of the multipler.

Pressure signal chanel 59 includes a phase correction amplifier 62 having an input connected to pressure signal terminal 23 through an input resistor 63 and through a two position calibration switch 64. Phase correction amplifier 62 is disposed in the pressure signal channel to compensate for phase lag in the volume signal channel to assure accuracy. We have found that an important source of error in prior indicators is a phase difference between the pressure and volume signals which may arise from a variety of causes ranging from phase shifts inherent in components of the signal channels to some degree of torsional twisting of the engine crankshaft which can cause the volume signal to be slightly out-of-phase with the true position of the piston. Phase correction amplifier 62 has a variable feedback capacitor 66 connected across the amplifier output and input in parallel with a feedback resistor 67 and thus the phase shift of a signal transmitted through the amplifier may be adjusted by adjustment of the capacitor. Detection of an out-of-phase relationship and techniques for adjusting capacitor 66 to correct such a relationship will be hereinafter discussed.

To further enhance precision, the output of amplifier 62 is transmitted through a low pass filter 68 which removes fluctuations in the signal which have a frequency substantially higher than the cycling rate of the engine. Filter 68 may be an additional amplifier 69 having an input coupled to the output of amplifier 62 through a resistor 71 and also connected to ground through a capacitor 72 and having a feedback resistor 73 and capacitor 74 connected in parallel across the amplifier input and output. The output of filter amplifier 69 is connected to the input of a pressure signal channel gain adjustment amplifier 76 through a resistor 77. Amplifier 76 has a variable resistor 78 connected across the input and output whereby the gain of the amplifier may be selectively varied for calibration purposes as will hereinafter be discussed. The output of amplifier 76 is transmitted to a first input of the analog multiplier 58.

Considering now components of the volume signal channel 61, the volume signal at terminal 48 is first applied to a differentiator means 79 which may consist of an amplifier 81 having an input coupled to terminal 48 through a capacitor 82 with a feedback resistor 83 being connected across the input and output of the amplifier. Differentiation of the volume signal from terminal 48 produces a signal at the output 84 of amplifier 81 which is proportional to the instantaneous velocity of the piston 16. The velocity signal is transmitted through a low pass filter 86 similar to the previously described filter 68. Thus filter 86 may consist of a resistor 87 connected between terminal 84 and the input of an amplifier 88, a capacitor 89 connected between the amplifier input and ground and resistor 91 and capacitor 92 connected across the input and output of amplifier 88. Filter 86 suppresses high frequency noise in the volume signal channel 61 to increase accuracy.

The velocity signal from amplifier 88 is transmitted to the second input of multiplier 58 through a resistor 93 and a variable gain amplifier 94 having a variable resistor 96 connected across the input and output for adjusting the gain through the volume signal channel 61 during calibration of the instrument as will hereinafter be discussed.

Accordingly, the two inputs of multiplier 58 each receive a constantly varying voltage one of which corresponds to instantaneous pressure and the other of which corresponds to instantaneous piston velocity. In accordance with the well understood operation of such a multiplier, a product signal voltage is present at the output terminal 97 of the multiplier which also varies but is at any instant proportional to the product of the voltages applied to the two inputs of the multiplier. The output 97 of multiplier 58 is coupled to digital voltmeter 57 through a pair of ganged manually operable cycle selector switches 98 and 99 and an input resistor 101 to an integrating circuit 102, the output of circuit 102 being coupled to the digital voltmeter 57 through an additional two position manually operable voltmeter input switch 103. Integrating circuit 102 may consist of capacitor 104 and resistance 106 connected in parallel across the input and output of an amplifier 105 and functions to perform the averaging operation hereinbefore discussed in connection with the mathematical processes performed by the circuit. Specifically, the cyclically varying output of multiplier 98 is averaged over many engine cycles resulting in the application of a steady DC voltage to voltmeter 57 having a magnitude indicative of the indicated power, generated within the engine combustion chamber. Calibration of the system to provide readout in IMEP units or other desired units will be herinafter discussed.

In order to obtain a thermodynamic (pressure volume) cycle diagram of the traditional form and to assist in calibration and in obtaining data for a predetermined portion of the total engine cycle as will hereinafter be discussed in more detail, an oscilloscope 107, preferably of the cathode-ray tube form, is utilized. The horizontal sweep terminal 108 of oscilloscope 107 is connected to volume signal terminal 48 and thus the horizontal axis of the oscilloscope display is representative of combustion chamber volume. A two position manually operable oscilloscope control switch 109 provides for selectively connecting the vertical sweep terminal 111 of the oscilloscope with either pressure signal terminal 23 or the junction 112 between switch 99 and resistor 101. Thus, with switch 109 positioned to connect the vertical sweep terminal 111 with pressure signal terminal 23, oscilloscope 107 displays the thermodynamic or pressure-volume cycle diagram of the engine in the form of a closed loop. The alternate position of switch 109 provides for a display useful in connection with measurement of data from component portions of the total cycle as will hereinafter be described in more detail.

The system further includes a gating and calibration circuit 113 for the purpose of obtaining a readout of IMEP for either the working cycle or pumping cycle of the engine and also for use in calibrating the system to assure that the readout at voltmeter 57 is in desired units. Considering now the components of circuit 113, an electronic analog switch 114 has input and output terminals 116 and 117 respectively and a control terminal 118 and is of the known form wherein the input - output circuit is open when control terminal 118 is electrically energized and is closed when the control terminal is unenergized. At the alternate settings of cycle selector switches 98 and 99, the output 97 of the multiplier 58 is connected to the averaging circuit 102 through the analog switch 114 rather than being directly connected thereto as at the other setting of switches 98 and 99. Thus, by gating tha analog switch 114 to be closed only during a selected portion of each complete engine cycle, the indicated power for that portion of the cycle may be read out at voltmeter 57.

To control the analog switch 114 for this purpose, a two position manually operable switch 119 provides for connection of control terminal 118 to either the inverting output 121 of a first flip-flop (bistable multivibrator) 122 or, alternately to the noninverted output 123 of the flip-flop. Flip-flop 122 is of the JK form which has a trigger input 124 and an additional pair of inputs 126 and wherein the outputs change state when a pulse is received at the input if a positive voltage is present at both additional inputs at that time, but do not change state in response to a trigger pulse if the additional inputs are not energized.

The additional inputs 126 of the flip-flop 122 are connected together and an input resistor 128 and level detector amplifier 127 are connected between volume signal terminal 48 and flip-flop inputs 126 to apply positive voltage to the flip-flop inputs 126 only when the volume signal is above a mean level. Amplifier 127 thus functions to inhibit or enable toggling of flip-flop 122 depending on the position of the engine piston 16. More specifically, the flip-flop 122 can only change state in response to a pulse received at the trigger input 124 when the engine piston is away from the top dead center position. To provide trigger pulses to flip-flop 122, the timing signal terminal 51 is coupled through a capacitor 130 to the input of an amplifier 129 which amplifies such signals and which has an output coupled to the input of another level detector amplifier 131 through an input resistor 132. Amplifier 131 acts to shape the top dead center and bottom dead center pulses whereby differentiation will produce a sharp welldefined positive voltage spike. To perform the differentiation, trigger input 124 of the flip-flop is connected to the output of amplifier 131 through a capacitor 133 and is connected to ground through a resistor 134 whereby the capacitor and resistor jointly act to differentiate the output of amplifier 131. A diode 136 connected in parallel with resistor 134 suppresses the negative spike resulting from the differentiation.

Thus, when it is desired to determine IMEP for the working cycle only or the pumping cycle only of the engine, switch 98 and 99 are operated to couple analog switch 114 into the signal path from multiplier 58 to averaging circuit 102 and switch 118 is operated to couple output 121 of flip-flop 122 to the control terminal 118 of the analog switch. Under this condition, the voltmeter 57 will readout IMEP only for alternate 360° periods of rotation of the crankshaft with the multiplier output circuit being opened during the intervening 360° periods of rotation and each such period will begin and end with the piston in the bottom dead center position.

This result is obtained since top dead center and bottom dead center pulses are transmitted to the trigger input 124 of flip-flop 122 with each 180° of rotation, but only the bottom dead center pulses are capable of toggling the flip-flop to cause a change of state at output 121 since the additional inputs 126 of the flip-flop are energized through amplifier 127 only during the periods that the bottom dead center pulses occur and are not energized while top dead center pulses occur.

It may be observed that upon operation of the switches 98, 99 and 119 as described above to readout IMEP for one half of the complete engine cycle, one might not initially know whether the readout being obtained was for the working cycle in particular or the pumping cycle in particular as this would depend on the exact instant, relative to the engine cycle, that switch 119 closed. However, one may readily ascertain which subcycle is being evaluated by temporarily setting switch 109 to the position at which the vertical sweep terminal 111 of the oscilloscope 107 is coupled to circuit junction 112 and then observing the resulting display on the oscilloscope. At this setting of switch 109, the oscilloscope will display a pumping cycle loop or working cycle loop according to which is being evaluated. These two loops are easily distinguished since the vertical height of the working cycle loop, wherein greater pressures are involved, is substantially higher than that of the pumping cycle loop, If it is observed that one is reading out data for one subcycle whereas it is desired to obtain a reading for the other subcycle, then it is only necessary to operate switch 119 to connect control terminal 118 of the analog switch to the other output 123 of flip-flop 122 which is inverted relative to output 121.

To assure precision of the readout, components of the circuit and channels of the circuit collectively must be accurately calibrated. The pressure transducer 18 and preamplifier 22 and volt meter 57 may be jointly calibrated prior to installation on the engine by applying a known weight per unit area to the active surface of the transducer and adjusting the preamplifier to produce a reading at the voltmeter in the desired units, for example, pounds per square inch per volt of preamplifier output. To facilitate this operation, which requires connection of the voltmeter input to the pressure signal terminal 23, independently of pressure signal channel 59, voltmeter input switch 103 has an alternate setting which connects the voltmeter to a calibrate conductor 137 which is in turn connectable to pressure signal terminal 23 by operating the previously described switch 64.

Following such calibration, transducer 18 may be installed in the engine as depicted in FIG. 1. The volume signal generator 24 may than be installed on the engine and it is necessary that the angular position of the disk 31 be adjusted to be phased with the piston position 16. This may conveniently be done by utilizing a conventional dial indicator of the known form having a rod which may extend into an opening in head 14 to contact the top of the piston and by utilizing a volt meter coupled to volume signal terminal 48 to assure that the volume signal is at a maximum at the bottom dead center position of the piston and is at the minimum at the top dead center position. As previously pointed out, it is important for assuring accuracy that any phase error between the pressure signal channel 59 and volume signal channel 61 be minimized and this may be accomplished by adjustment of the variable feedback capacitor 66 at phase correction amplifier 62. To detect the presence of phase error, any suitable conventiona source of sine wave alternating voltage may be coupled to the inputs of preamplifiers 22 and 49 to apply equal sine wave signals to the two channels 59 and 61 while switches 98 and 99 are set to transmit the output of multiplier 58 to averaging circuit 102 and switch 103 is set to transmit the output of the averaging circuit to voltmeter 57. If ther is no phase error in the system, the relative phase difference between channels 59 and 61 will be 90°. Then with identical sine wave excitation applied to both channels, a zero or null reading will be indicated at the voltmeter. If at this time the voltmeter 57 indicates some reading other than zero, adjustment of the capacitor 66 to bring the voltmeter reading to the zero value assures that the phase error has been eliminated.

It is also necessary to adjust the gain of the pressure signal channel 59 and that of the volume signal channel 61, by means of variable resistors 78 and 96 respectively, to assure that the readout at voltmeter 57 is in desired units such as in terms of IMEP. To do this in the most convenient manner, the gating and calibration circuit 113 includes additional components which will now be described. IMEP, by definition, is that constant pressure which would generate the same power on one stroke of the piston as the power actually generated by the varying pressure throughout the entire cycle. This constant pressure is simulated for calibration purposes by applying a fixed known calibration voltage to the pressure signal channel 59, while temporarily disconnecting the actual variable pressure signal therefrom, with the calibration voltage being applied only during the periods corresponding to working strokes of a simulated two stroke cycle. Given this fixed input voltage to the pressure signal channel, corresponding to a known pressure on the transcuer 18, resistors 78 and 96 may be adjusted to provide gains in the signal channels 59 and 61 which result in the voltmeter 57 reading out the IMEP corresponding to the calibration voltage.

For this purpose, a calibration voltage source 138 has a negative terminal connected directly to ground and a positive terminal connected to ground through the emitter-collector circuit of a transistor 139 and through the resistance element of a potentiometer 141. The voltage selecting contact 142 of potentiometer 141 is connected to the input of a buffer amplifier 143 through an input resistor 144, a feedback resistor 146 being connected across the input and output of the amplifier. The output of amplifier 143 is connected to the input of pressure signal channel 59, by operation of calibration switch 64, through a conductor 147. Thus, the fixed known calibration voltage to be applied to the pressure signal channel 59 may be selected by adjustment of potentiometer 141. With switch 64 operated to connect to conductor 147, the calibrator voltage may be checked at voltmeter 57 by temporarily operating switch 103 to connect the voltmeter to conductor 137.

As discussed above, it is necessary that this calibration voltage be applied to the input of the pressure signal channel 59 only during those periods corresponding to the working stroke portion of the simulated engine cycle. Accordingly, transistor 139 operates to close the circuit between calibration voltage source 138 and potentiometer 141 only during the simulated working stroke portions of the successive cycles. While the engine may be of the four stroke cycle variety, it may be treated as a two stroke cycle engine for the present calibration purposes. In other words, the transistor 139 may be biased into conduction during one half of each complete revolution of the crankshaft for the simulated cycle although in the actual four stroke cycle a working stroke occurs only once every two revolutions.

A second flip-flop 148 controls the transistor 139 for this purpose. Flip-flop 148 is of the JK form hereinbefore discussed and has a trigger input 149 connected to the output of amplifier 131 through capacitor 133 to receive the same top dead center and bottom dead center pulses as is received by the other flip-flop 122. The K input 151 of flip-flop 148 receives a fixed positive input signal from a voltage source 152 while the J input 153 of the flip-flop 148 is connectable to the output of inhibit-enable amplifier 127 through a switch 154. Switch 154 has an alternate position which grounds the J input 153 So inactivate the transistor 139. Flip-flop 148 has a non-inverted output 156 and an inverted output 157 and a manually operable switch 158 provides for selectively connecting the base of transistor 139 to either output 156 or output 157 of flip-flop 148.

Calibration is accomplished by shifting switch 64 to connect the input to pressure signal channel 59 with the output of buffer amplifier 143. Switch 154 is operated to connect the J input 153 of flip-flop 148 with amplifier 127 and switch 158 is operated to connect the base of transistor 139 with flip-flop output 156. The engine is then operated at a constant speed. Under this condition, transistor 139 is biased into conduction only during alternate 180° rotation periods of the engine crankshaft since K input 153 of flip-flop 148 is held energized while J input 151 is alternately energized and de-energized as successive trigger pulses are received. Thus the output 156 of the flip-flop changes state with each top dead center and bottom dead center timing pulse at trigger input 149 of the flip-flop. Flip-flop outputs 156 and 157 are thus alternately energized for periods corresponding to 180° of crankshaft revolution and transistor 139 is thereby gated into conduction during 180° of each full revolution commencing with either the top dead center or bottom dead center position. If, owing to the timing of activation of the calibration system, the simulated pressure signal is being applied during the bottom dead center to top dead center periods, this may be changed to the other half of each cycle by shifting switch 158 to the alternate position at which the base of transistor 139 is connected to the other output of flip-flop 148.

Following these operations, the gain of amplifier 76 and 94 may be adjusted to cause voltmeter 57 to readout the knonw IMEP value corresponding to the calibration voltage being applied to the pressure signal channel 59. Following such calibration, switches 64 and 154 may be restored to the original positions and apparatus may be utilized to obtain engine data as hereinbefore described.

While the invention has been disclosed with respect to a single exempliary embodiment, it will be apparent that many variations are possible and it is not intended to limit the invention except as defined in the following claims.

What is claimed is:

1. Apparatus for determining indicated power in an engine wherein the volume of a combustion chamber and the pressure therein each vary cyclically in the course of engine operation, comprising;

pressure transducer means attachable to said engine for producing a pressure signal voltage which varies in accordance with said pressure variation in said combustion chamber, volume signal generating means attachable to said engine for producing a volume signal voltage which varies in accordance with said volume variation of said combustion chamber, multiplier means of the form having first and second inputs and an output having a product voltage which varies in accordance with the product of variable voltages applied to said inputs, pressure signal channel means connected between said pressure transducer means and said first input of said multiplier means, volume signal channel means connected between said volume signal generating means and said second input of said multiplier means, voltmeter means for indicating a value proportional to the magnitude of a voltage applied to an input thereof, an integrating circuit connected between said output of said multiplier means and said input of said voltmeter means for applying a voltage to said voltmeter means input which is an averaged value of said variable output voltage of said multiplier means, and amplifier means for selectively adjusting the gain of at least one of said pressure signal channel means and said volume signal channel means.

2. Apparatus for determining indicated power in an engine wherein the volume of a combustion chamber and the pressure therein each vary cyclically in the course of engine operation, comprising:

pressure transducer means attachable to said engine for producing a pressure signal voltage which varies in accordance with said pressure variation in said combustion chamber, volume signal generating means attachable to said engine for producing a volume signal voltage which varies in accordance with said volume variation of said combustion chamber, multiplier means of the form having first and second inputs and an output having a product voltage which varies in accordance with the product of variable voltages applied to said inputs, pressure signal channel means connected between said pressure transducer means and said first input of said multiplier means, volume signal channel means connected between said volume signal generating means and said second input of said multiplier means, voltmeter means for indicating a value proportional to the magnitude of a voltage applied to an input thereof, an integrating circuit connected between said output of said multiplier means and said input of said voltmeter means for applying a voltage to said voltmeter means input means is an averaged value of said variable output voltage of said multiplier means, and means for adjusting signal phase shift in said pressure signal channel means and said volume signal channel means.

3. Apparatus for determining indicated power in an engine wherein the volume of a combustion chamber and the pressure therein each vary cyclically in the course of engine operation, and wherein said engine includes a rotary element which rotates in synchronism with said variations of the volume of said combustion chamber, comprising:

pressure transducer means attachable to said engine for producing a pressure signal voltage which varies in accordance with said pressure variation in said combustion chamber, volume signal generating means attachable to said engine for producing a volume signal voltage which varies in accordance with said volume variation of said combustion chamber, said volume signal generating means having a rotatable shaft coupled to said rotary element for rotation therewith, photosensitive electrical means for producing a voltage proportional to the amount of light falling on said device, opaque means having a slot therein directed radially with respect to the axis of rotation of said shaft, a circular disk mounted on said shaft in eccentric relation thereto for rotation therewith, and having an edge which moves radially inwardly and outwardly along said slot as said shaft rotates to cyclically vary the effective length of said slot, a housing enclosing said opaque means and said disk, a remote light source situated apart from said engine and said housing, and light transmitting means extending from said light source into said housing and toward said shaft and having a light emitting end which directs light from said source toward said photosensitive element through said slot, multiplier means of the form having first and second inputs and an output having a product voltage which varies in accordance with the product of variable voltages applied to said inputs, pressure signal channel means connected between said pressure transducer means and said first input of said multiplier means, volume signal channel means connected between said volume signal generating means and said second input of said multiplier means, voltmeter means for indicating a value proportional to the magnitude of a voltage applied to an input thereof, and an integrating circuit connected between said output of said multiplier means and said input of said voltmeter means for applying a voltage to said voltmeter means input which is an averaged value of said variable output voltage of said multiplier means.

4. Apparatus for determining indicated power in an engine wherein the volume of a combustion chamber and the pressure therein each vary cyclically in the course of engine operation, comprising;

pressure transducer means attachable to said engine for producing a pressure signal voltage which varies in accordance with said pressure variation in said combustion chamber, volume signal generating means attachable to said engine for producing a volume signal voltage which varies in accordance with said volume variation of said combustion chamber, multiplier means of the form having first and second inputs and an output having a product voltage which varies in accordance with the product of variable voltages applied to said inputs, pressure signal channel means connected between said pressure transducer means and said first input of said multiplier means, volume signal channel means connected between said volume signal generating means and said second input of said multiplier means, voltmeter means for indicating a value proportional to the magnitude of a voltage applied to an input thereof, an integrating circuit connected between said output of said multiplier means and said input of said voltmeter means for applying a voltage to said voltmeter means input which is an averaged value of said variable output voltage of said multiplier means, calibration means including a calibration voltage source for producing a predetermined known voltage corresponding to the voltage produced by said pressure transducer means by a known pressure within said combustion chamber, and calibration switch means for selectively and temporarily decoupling said pressure signal channel means from said pressure transducer means while coupling said calibration voltage source to said pressure signal channel means, electrical signal controlled switch means connected between said calibration voltage source and said pressure signal transmitting means, and gating means for producing electrical gating signals for opening and closing said electrical signal controlled switch means during a predetermined portion of each successive full cycle of said engine.

5. Apparatus for determining indicated power in an engine wherein the volume of a combustion chamber and the pressure therein each vary cyclically in the course of engine operation, comprising;

pressure transducer means attachable to said engine for producing a pressure signal voltage which varies in accordance with said pressure variation in said combustion chamber, volume signal generating means attachable to said engine for producing a volume signal voltage which varies in accordance with said volume variation of said combustion chamber, multiplier means of the form having first and second inputs and an output having a product voltage which varies in accordance with the product of variable voltages applied to said inputs, pressure signal channel means connected between said pressure transducer means and said first input of said multiplier means, volume signal channel means connected between said volume signal generating means and said second input of said multiplier means, voltmeter means for indicating a value proportional to the magnitude of a voltage applied to an input thereof, an integrating circuit connected between said output of said multiplier means and said input of said voltmeter means for applying a voltage to said voltmeter means input which is an averaged value of said variable output voltage of said multiplier means, timing pulse generating means attachable to said engine for producing a discrete timing pulse at a predetermined point in each successive cycle of said engine, electronic switch means for transmitting said product voltage of said multiplier means to said integrating circuit, and gating circuit means responsive to said timing pulses for closing said electronic switch means during a predetermined portion of each successive cycle of said engine and for opening said electronic switch means during other portions of each cycle whereby said voltmeter means indicates power for said predetermined portion of the cycle of said engine.

6. The combination defined in claim 5 further comprising manually operable switch means having a first position at which said output of said multiplier means is coupled to said integrating circuit independently of said electronic switch means and having a second position at which said output of said multiplier means is coupled to said integrating circuit through said electronic switch means.

7. The combination defined in claim 5 wherein the element which moves to cyclically vary the volume of said combustion chamber of said engine is a reciprocating piston therein and wherein said timing pulse generating means comprises means for generating a top dead center pulse each time said piston reduces said combustion chamber to the minimum volume thereof and for producing a bottom dead center pulse each time said piston expands said combustion chamber volume to the maximum volume thereof, and wherein said gating circuit means comprises a bi-stable circuit element having a trigger input receiving said timing pulses and having an output coupled to said electronic switch means to control said electronic switch means and having means for changing the state of said output to close said electronic switch in response to alternate ones of said bottom dead center pulses and for opening said electronic switch in response to the others of said bottom dead center pulses and for holding said bistable circuit element output unchanged when said top dead center pulses are applied to said trigger input thereof.

8. Apparatus for determining indicated power in an engine having a combustion chamber with a reciprocal piston therein and having a rotary element which turns in synchronism with the reciprocal motion of said piston, comprising;

a pressure transducer mountable on said engine and having a surface exposable to pressure within said combustion chamber and producing a pressure signal voltage proportional to instantaneous pressure within said combustion chamber, a volume signal generator attachable to said engine and having a rotatable shaft connectable to said rotary element of said engine and having a photosensitive electrical circuit element for producing a voltage proportional to ambient light reaching said element and having a light source for directing light towards said element and means driven by said shaft and extending into the light path between said source and said photosensitive element for varying the amount of light which reaches said element in accordance with the instantaneous position of said piston in said combustion chamber whereby said photosensitive element produces a volume signal voltage proportional to the instantaneous volume of said combustion chamber, said volume signal generator further having electro-optical means for producing a timing pulse each time said piston reaches top dead center position and bottom dead center position, an analog multiplier of the form having first and second inputs for receiving variable voltages and having an output at which voltage is proportional to the instantaneous product of voltages present at said inputs at any given time, pressure signal channel means connected between said pressure transducer and said first input of said analog multiplier and having means for adjusting the gain through said pressure signal channel and means for suppressing cyclical components of said pressure signal voltage above a predetermined frequency which is higher than the cycling rate of said engine and having means for selectively adjusting the phase shift of signals transmitted through said pressure signal channel, means defining a volume signal channel connected between said photosensitive element of volume signal generator and said second input of said analog multiplier and having means for differentiating said volume signal voltage to produce a piston velocity signal voltage and means for suppressing signals above a predetermined frequency and means for selectively adjusting the gain through said volume signal channel, a voltmeter for indicating a numerical value proportional to a voltage applied to said voltmeter, an integrating circuit having an input and having an output coupled to said voltmeter, an electronic switch having a control terminal to which a signal may be applied to close said switch, manually operable cycle selector switch means for selectively connecting said output of said analog multiplier to said input of said integrating circuit independently of said electronic switch at one setting of said selector switch and for connecting said output of said analog multiplier to said input of said integrating circuit through said electronic switch at another setting of said selector switch, a first bi-stable circuit element having a trigger input and having an inverted output and a noninverted output, manual switch means for selectively connecting said control terminal of said analog switch to a selected one of said outputs of said first bi-stable circuit element, means for transmitting said timing pulses from said volume signal generator to said trigger input of said first bi-stable circuit element, means connected between said volume signal generator and said first bi-stable circuit element for inhibiting a change of state of said outputs of said first bi-stable circuit element in response to timing pulses received at said trigger input thereof when said volume signal is above a predetermined level whereby said first bi-stable circuit element and said electronic switch respond only to said bottom dead center pulses and not to said top dead center pulses.

9. The combination defined in claim 8 further comprising means for displaying the amplitude of signals transmitted to said integrating circuit through said electronic switch whereby it may be ascertained if said voltmeter is indicating power for a working cycle or pumping cycle of said engine and whereby said switch means may be operated to connect said control terminal of said electronic switch to the other of said outputs of said first bi-stable circuit element to determine indicated power for the other cycle of said engine.

10. The combination defined in claim 8 having calibration means comprising a calibration voltage source of known magnitude electrically controlled switching means for transmitting a fixed known calibration voltage from said source to said pressure signal channel means in response to a gating signal applied to said electrically controlled switching means, a second bi-stable circuit element having a trigger input and having a non-inverted output and an inverted output, switch means for selectively connecting said electrical circuit element to a selected one of said outputs of said second bi-stable circuit element, and means for transmitting said timing pulses to said trigger input of said second bi-stable circuit element whereby said calibration voltage is transmitted to said pressure signal channel means only during alternate intervals between the top dead center and bottom dead center position of said piston.

* * * * *